Feb. 19, 1952 F. O. JOHNSON 2,586,052
CUTOFF MECHANISM
Filed Jan. 18, 1947 2 SHEETS—SHEET 2
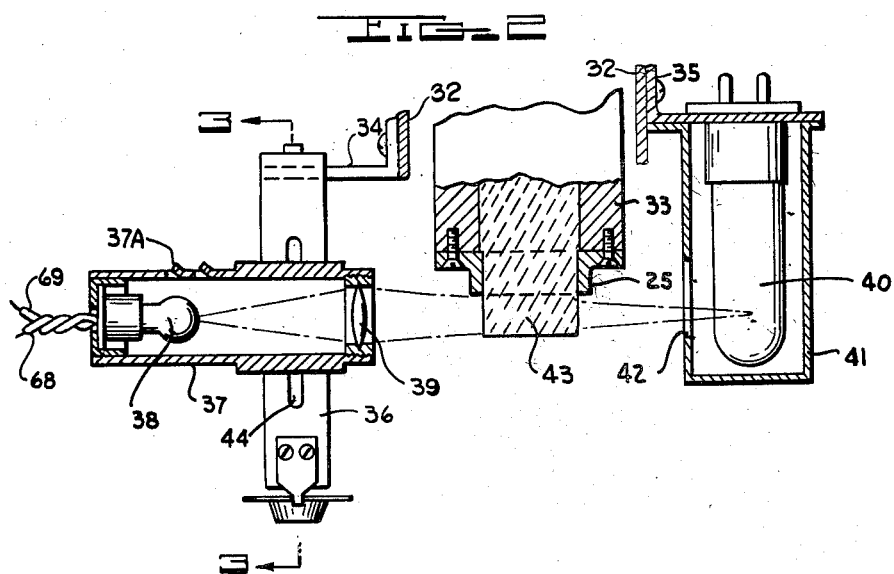
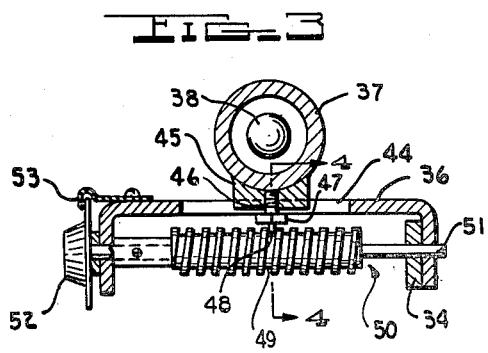
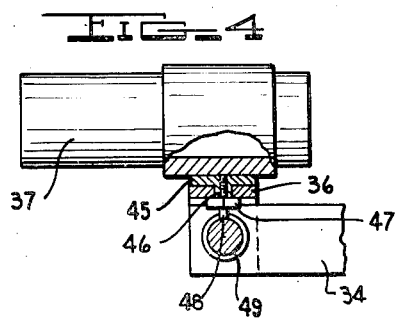
INVENTOR.
FREDERICK ORLO JOHNSON
BY
ATTORNEY

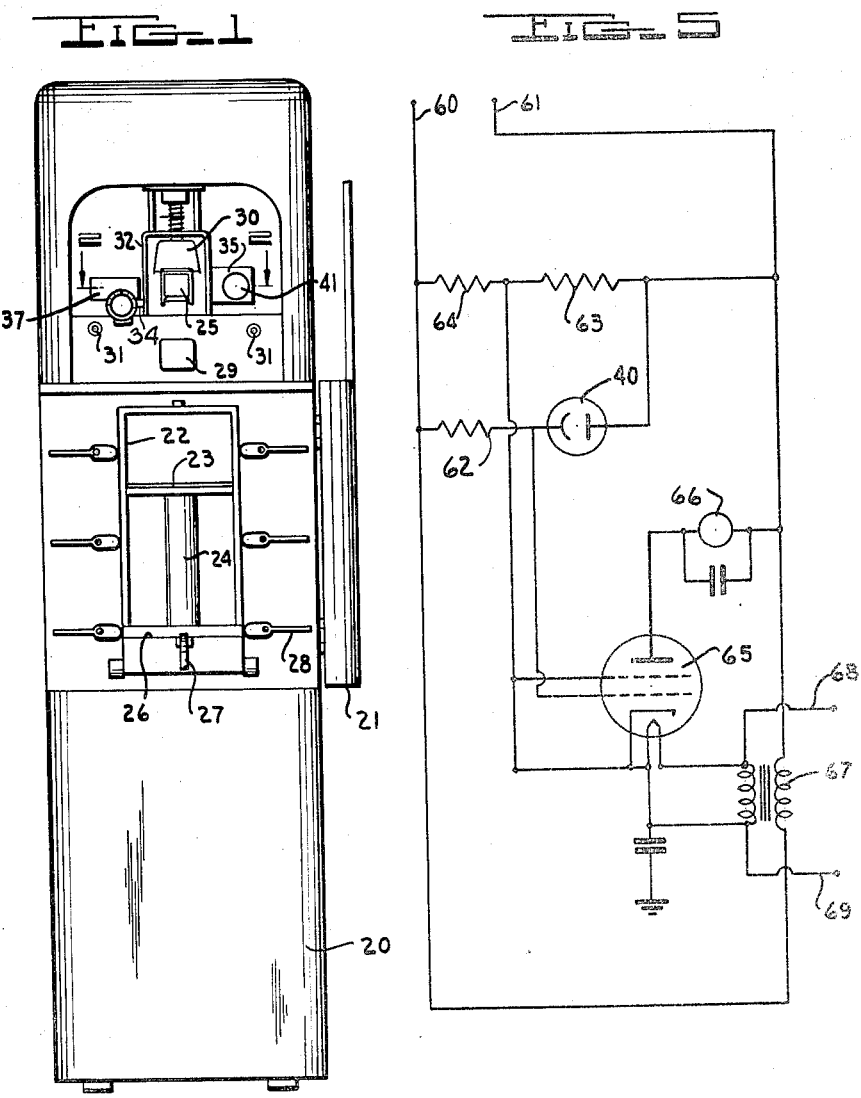

Patented Feb. 19, 1952

2,586,052

UNITED STATES PATENT OFFICE 2,586,052

CUTOFF MECHANISM

Frederick Orlo Johnson, Birmingham, Mich.

Application January 18, 1947, Serial No. 722,894

3 Claims. (Cl. 250—218)

The present invention relates to an adjustable cut-off mechanism for a dispensing machine adapted to extrude, cut-off and dispense a selected portion of an extrudable material such, for example, as butter and the like or similar substances. The present invention may be used on the dispensing machine shown in my copending application, Serial No. 722,893, filed January 18, 1947, and my United States Letters Patent No. 2,478,401.

A principal object of the invention is to provide an adjustable cut-off mechanism for a dispensing machine in which butter or a like extrudable substance may be extruded from a container or pressure chamber in a preselected amount and is thereafter severed by a reciprocating cutter to produce blocks or pieces thereof of a satisfactory appearance and a uniform predetermined size.

A further object of the present invention is to provide an adjustable cut-off mechanism for a dispensing machine particularly adapted for extruding and dispensing butter and the like or similar materials and in which separate blocks, chips, patties or servings are selectively cut from an extruded strip of such material in such a manner that the thickness of each individual piece conforms to a desired standard of thickness, which standard may be varied by a simple adjustment of the cut-off mechanism control.

It is the further object of the present invention to provide an adjustable light controlled mechanism for a dispensing machine in which print, roll or bulk butter or similar materials may be extruded through an extrusion orifice or selected size and shape and in which the individual servings of an adjustable predetermined size will be cut as needed upon each operation of the machine, thus providing a desired number of servings from a given amount of butter placed in the machine and thus reducing waste of the butter or similar materials while assuring uniform servings thereof to the consumer.

A further object of the present invention is to provide an adjustable cut-off control for a machine for dispensing butter or similar materials in which the thickness of the individual servings may be easily regulated to assure the serving of a predetermined portion to each customer, the machine having a sanitary, refrigerated chamber in which the bulk material is so stored that the entire operation of extruding, cutting and dispensing the said predetermined portions of the butter is accomplished without allowing the butter to come in contact with sources of contamination.

It is the further object of the present invention to provide an adjustable cut-off control mechanism for a machine particularly adapted for dispensing butter or similar extrudable food materials and in which the thickness of the dispensed patty or chip is controlled at the extrusion orifice adjacent the point where the patty or chip is separated from the continuous strip of extruded material.

It is a further object of the present invention to provide an adjustable control device for actuating the cut-off mechanism of a butter dispensing machine in which a photo-electric control circuit is actuated by an exciter lamp and in which provision is made to reduce the heat transmitted from the exciter lamp to the butter tube of the machine and in which the adjustment of the cut-off mechanism regulates the thickness of the butter patty or chip at a point adjacent the butter extrusion orifice.

A dispensing machine of the type with which the adjustable cut-off mechanism of the present invention is particularly adapted for use is designed to form butter chips or patties such as are served in restaurants, hotel dining rooms, and other places where a large number of individual portions of butter are needed. Conventional methods of providing separate patties or chips of butter have not been satisfactory either from the economic or the sanitary standpoint. From the economic standpoint the variations in thicknesses of the butter pats or chips when cut manually, or by the machines previously known in the art, prevents an accurate ascertainment of the number of servings supplied from a given amount of butter. It frequently occurs that with several customers seated at a table, the variations in thicknesses of the butter pats or chips will be so marked as to lead to customer complaints and frequently for requests for additional butter. Such procedures, in addition to causing customer complaints also are not economical for some customers will get more butter than needed while other customers will get less butter than needed.

Other objects of this invention will appear in the following description and appended claims, reference being had to the accompanying drawings forming a part of this specification wherein like reference characters designate corresponding parts in the several views.

In the drawings:

Fig. 1 is a front elevation of a butter dispensing machine shown with its front door in the open position and showing the use of an adjustable cut-off control mechanism of the present invention.

Fig. 2 is an enlarged section taken substantially on the line 2—2 in the direction of the arrows Fig. 1, but showing a column of butter extruded through the extrusion orifice.

Fig. 3 is a section taken substantially on the line 3—3 in the direction of the arrows, Fig. 2.

Fig. 4 is a section taken substantially on the line 4—4 in the direction of the arrows, Fig. 3.

Fig. 5 is an electrical circuit diagram.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A butter dispensing machine embodying the adjustable cut-off control mechanism of the present invention is shown in Fig. 1 and comprises a housing 20 having a hinged access door 21 here shown in the open position to reveal the interior arrangement of the parts of the machine.

Butter or other extrudable material to be dispensed from the machine is placed in the chamber 22 in which is mounted a pressure plate 23 carried by a power actuated ram 24 which is supplied with power from a suitable power source to exert a force on the pressure plate 23 and extrude material in the chamber 22 through an extrusion orifice 25. A hinged access door 26, here shown in its open position, permits access to the chamber 22 for loading the machine with the material to be extruded. The access door 26 is securely clamped in its closed position by a plurality of pivoted clamping members 28. A pivoted lever 27 is provided to permit the application of sufficient forces on the door 26 to break the seal thereof.

The machine is actuated by contact with a trigger plate 29 which actuates an electrical switch (not shown) which controls an electrical circuit to actuate the solenoid control cut-off knife 30.

The trigger plate 29 is illuminated by a plurality of lamps 31 which are suitably mounted on the housing 20 back of the access door 21 to provide for the indirect illumination of the plate 29 without any shadows. The lamps 31 are suitably shielded or masked to illuminate only that area of the machine adjacent to plate 29.

When the door 21 is closed, an open aperture (not shown) is positioned over the plate 29 so that the machine may be actuated by contact of a serving plate with the trigger plate 29.

The construction and operation of the dispensing machine here shown is fully disclosed in my copending application Serial No. 722,893 and Patent No. 2,478,401 to which reference is hereby made for any desired additional details of its construction or operation.

The cut-off control mechanism of the present invention is mounted on a U-shaped bracket 32 which extends downwardly and overlies the sides of the extrusion orifice 25. The bracket 32 is connected with the housing 33 to which extrusion orifice 25 is connected (Fig. 2) and is provided with extending arms 34 and 35.

The extending arm 34 lies on one side of the extrusion orifice 25 and supports a lamp mounting bracket 36 on which is mounted a tubular telescoping housing 37 in which an exciter lamp 38 is adjustably mounted for focusing movement relative to the lens 39. Louvers 37a are provided in the housing 37 and permit ventilation of the housing 37 without allowing light rays to escape therefrom. The lamp 38 is electrically connected with a suitable source of electric energy through the connectors 68 and 69. A lens 39 is mounted in the other end of the tubular housing 37 and permits focusing and projection of the light rays from the lamp 38 on the light sensitive element of a photo-electric tube 40 which is mounted on the arm 35 and is electrically connected with any suitable type of photo-electric actuated circuit which will effect operation of the cut-off knife 30 and the application of power to ram 24 to effect the desired extrusion of butter from the orifice 25.

A shield 41 is mounted on the arm 35 and cuts off light to the photo-electric tube 40 except through an elongated slot 42. The interior of the shield 41 is painted a dull black to prevent the reflection of light therefrom.

The light from the lens 39 is focused on the slot 42 and projects the pattern of the incandescent filament of the lamp 38 directly on the photo-electric tube 40. The lamp 38 may be suitably mounted so that the pattern of the incandescent filament will be projected with its longitudinal axis lying in a vertical plane. Thus there is no scattering of the light rays of the lamps 38 and hence a relatively small lamp may be utilized. This reduces the current consumption and also reduces the heat generated by the lamp so that the consistency of the extruded butter is not adversely affected thereby.

As shown in Fig. 2, a column of butter has been extruded from the orifice 25 to provide an overhanging portion 43 which blocks the light from the exciter lamp 38 and so actuates the photo-electric control circuit as to shut off the application of power to the ram 24. When the cut-off knife 30 is actuated in response to pressure applied to the trigger plate 29, the overhanging portion 43 of butter is cut off adjacent the extrusion orifice and light from the exciter lamp 38 falls on the photo-electric tube 40 which operates an electrical control circuit which causes the application of power on the ram 24 which extrudes butter through the orifice 25 until the light beam is again cut off. This blocking of the light beam causes the power on the ram 24 to be cut off and stops further extrusion of the butter. Hence the position of the exciter lamp 38 determines the extent to which butter may be extruded through the orifice 25 before the power is cut off the ram 24.

The exciter lamp 38 and the housing 37 are adjustably mounted on the bracket 36 for movement in the elongated way 44 in the bracket 36. A depending guide 45 extends downwardly from the housing 37 and slides in the way 44. A depending screw-threaded pilot 46 extends into the guide 45 and is provided with a connector nut 47 which bears on the lower face of the bracket 36 on opposite sides of the way 44 to hold the parts for operation in their assembled positions. The lower end 48 of the pilot 46 extends downwardly below the lower face of the connector nut and engages with threads 49 provided in the rotatable lead screw 50 which is mounted on a shaft 51 whose ends are journaled in the bracket 36. A calibrated adjustment knob and dial 52 is placed outside the bracket 36 and connects with an extending end of the shaft 51. A pointer 53 is mounted on the bracket 36 and has a pointed end which overlies the calibrations on the adjustment knob and dial 52. Thus by rotation on the adjustable knob and dial 52, the lamp housing 37 and the lamp 38 may be moved to vary the position of the light beam relative to the extrusion orifice 25 and thus to control the point at which the light is cut off from the photo-electric tube 40. The calibrations on the adjusting knob and dial 52 are preferably in terms of the number of servings per unit of butter placed in the machine since an accurate control as to the size of the servings may be readily achieved by the machine here shown.

While I have shown the movable mounting of the exciter lamp 38, it is to be understood that the entire bracket 32 may, if desired, be movably mounted on the machine so as to move both the exciter lamp 38 and the photo-electric tube 40 relative to the extrusion orifice 25.

While any desired type of light operated relay circuit may be employed in conjunction with the photo-electric tube 40, the simplified circuit shown diagrammatically in Fig. 5 has been found to be satisfactory since as here shown, the circuit comprises leads 60 and 61 connected with a suitable source of 110-volt alternating electric current. The photo-electric tube 40 is electrically connected in the circuit through fixed capacity resistors 62, 63 and 64 and is electrically connected with a trigger tube 65 which in turn is electrically connected with a control relay 66 which is electrically connected with a machine control circuit (not shown). A transformer 67 is electrically connected in the circuit to provide a source of low voltage current to the leads 68 and 69 which are electrically connected with the lamp 38.

From the foregoing, it will be seen that I have provided a cut-off control mechanism for a dispensing machine which is particularly adapted to extrude, cut-off and dispense materials of a plastic nature such, for example, as butter or other foodstuffs or dairy products, the mechanism being particularly characterized by:

1. Its accurate measurement of the thickness of the extruded material at the extrusion orifice 25.

2. The operating cycle of the machine which provides instantaneous operation and cut-off of the butter chip 43 while provision is made to cut the pressures off the ram 24 to prevent any undesired or unintended extrusion of the material. This is accomplished by cutting off the power to the ram 24 and relieves the extrusion pressure on the materials in the container 22 so that after the extruded material is cut off and after the next chip has been extruded there is no further pressure exerted on it to effect extrusion thereof until the cut-off mechanism is reset for the next machine operation.

3. The accurate adjustment of the thickness of the cut-off butter patties by a readily adjusted control member actuated by a calibrated control knob which indicates visually the number of patties to be cut from a given unit of butter placed in the machine.

I claim:

1. An adjustable control mechanism having a light sensitive circuit for controlling the thickness of an extruded material to be cut off adjacent an extrusion orifice, including a fixed U-shaped bracket comprising parallel outwardly extending end portions and a transverse portion having a longitudinal extending guide slot, a lead screw positioned opposite said slot and having the ends thereof journaled for rotation in said end portions, a lamp housing positioned on the outer side of the bracket and having a pilot extending through said guide slot, the end of said pilot engaging the threads of said screw, a lamp within said housing, said lamp housing being movable relative to said bracket in response to rotation of said screw.

2. An adjustable control mechanism in accordance with claim 1 and being further characterized in that said housing is provided with a convergent lens for focusing the light rays from said lamp on said light sensitive control circuit.

3. An adjustable control mechanism in accordance with claim 2 and being further characterized in that said housing is of telescopic construction, said lamp being mounted within one portion of said housing and said lens being mounted within another portion of said housing whereby telescopic movement of said housing varies the distance between said lamp and said lens to focus light on said light sensitive circuit.

FREDERICK ORLO JOHNSON.

REFERENCES CITED

The following references are of record in the file of this patent:

UNITED STATES PATENTS

| Number | Name | Date |
|---|---|---|
| 957,299 | Barnes | May 10, 1910 |
| 1,323,420 | Sutter | Dec. 2, 1919 |
| 1,898,705 | Wood et al. | Feb. 21, 1933 |
| 1,941,552 | Henry et al. | Jan. 2, 1934 |
| 2,010,777 | Grotta | Aug. 6, 1935 |
| 2,340,253 | Schmitt | Jan. 25, 1944 |

FOREIGN PATENTS

| Number | Country | Date |
|---|---|---|
| 2,518 | Great Britain | of 1889 |